United States Patent [19]

Hudgins

[11] 3,848,879

[45] Nov. 19, 1974

[54] SHAFT SEAL

[75] Inventor: Wayne A. Hudgins, Hampton, Va.

[73] Assignee: The United States of America as represented by the Secretary of the Army, Washington, D.C.

[22] Filed: Dec. 19, 1972

[21] Appl. No.: 316,646

[52] U.S. Cl. ............................................. 277/80
[51] Int. Cl. ........................ F16j 9/00, E21b 33/00
[58] Field of Search............ 277/80, 72 R; 192/21.5

[56] References Cited
UNITED STATES PATENTS

| | | | |
|---|---|---|---|
| 3,254,745 | 6/1966 | Isakov et al................... | 277/80 X |
| 3,272,516 | 9/1966 | Hoffman ......................... | 277/72 R |
| 3,612,549 | 10/1971 | Berkowitz........................ | 277/80 |

Primary Examiner—Samuel B. Rothberg
Attorney, Agent, or Firm—Eugene E. Stevens, III

[57] ABSTRACT

A sealing apparatus for use in gearbox/transmission systems which contain fluids miscible with ferrofluids. A ferrofluid seal is combined with a controlled clearance (Labyrinth) seal and a pressurized air cavity, the ferrofluid seal providing the external seal and the controlled clearance seal and the pressurized air cavity preventing the internal fluids from contacting the ferrofluid.

4 Claims, 1 Drawing Figure

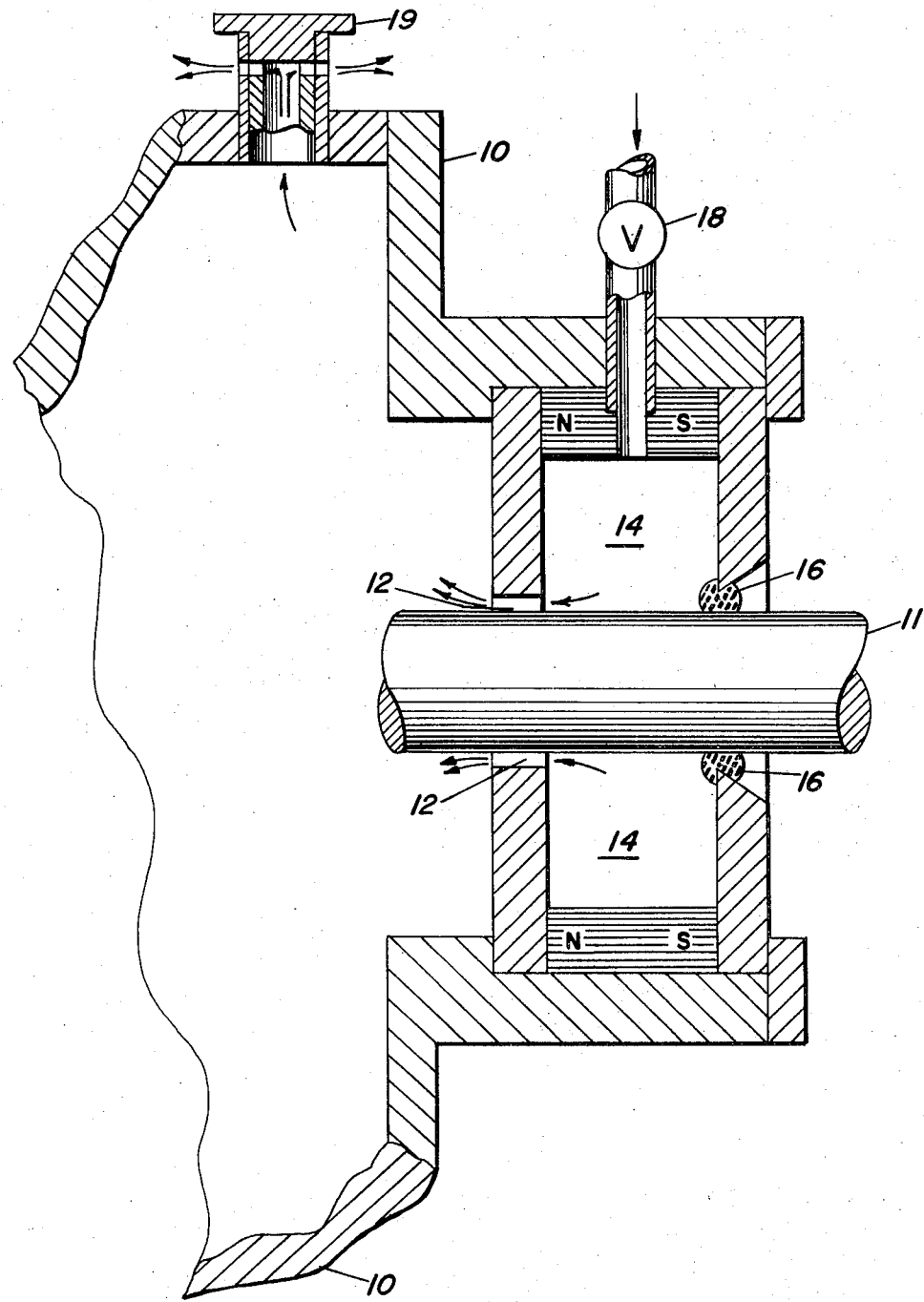

SHAFT SEAL

The present invention relates to seals on shafts of transmission and gearbox systems operating with synthetic lubricants. More particularly, it relates to Labyrinth seals in conjunction with ferrofluid seals in gearboxes/transmissions which utilize fluids which are normally miscible with ferrofluids.

An object of my invention is the separation of the miscible fluids from the ferrofluids in order to preserve the magnetic-fluid seal.

Another object of my invention is to provide a seal which is not worn through use.

Still another object of my invention is to eliminate the temperature limitation present in single ferromagnetic seals.

Other objects and advantages of the invention will be apparent during the course of the following description.

A ferrofluid seal is a unique new type of seal which utilizes a magnetic field to impart solid or semi-solid properties to a liquid having a concentration of magnetizable particles suspended therein. Thus by providing a small volume of ferrofluid in the tolerance space between a shaft and its bearing surface and subjecting this space to a magnetic force, the ferrofluid assumes the properties of a solid and acts as firm seal against leaks by the contained liquid.

Advantages of ferrofluid seals are (1) zero leakage within the operating specifications, (2) no rubbing between solid materials, (3) no particles generated by wear, (4) high surface finish not required on the shaft, (5) wider dimensional tolerances on the shaft can be accommodated, (6) no external lubrication required, (7) no overhaul necessary to recharge seal fluid, (8) little heat generated, (9) very high operating surface speeds possible, and (10) no vibration or squeal.

However, there are certain limitations to the use of ferromagnetic seals to which I address myself in this invention. Included are (1) differential pressure is limited to about 10 psi per stage, (2) operating temperature is limited to about 200°F, and (3) most important of all, the fluid to be retained by the seal must not be miscible with ferrofluid.

The latter disadvantage stems from the fact that the ferrofluid seal is composed of a liquid carrier such as mineral oil with small ferrous particles suspended in it. A certain minimum viscosity is needed and the ferrofluid beomes a semi-solid upon magnetization. If the ferrofluid is diluted by the retained liquid, the seal will tend to become less viscous, lose its semi-solid state and creep from its sealing position thereby breaking the seal altogether. Very little use of these ferrofluid seals has been made in conjunction with housings for miscible liquids. This is especially true in connection with transmission housings and gear boxes and the like where in addition to the differential pressure and temperature limitations, the lubricants are miscible with the ferrofluid.

I have determined that the best way to overcome the above mentioned limitations is a ferrofluid seal is by the use of positive pressure in a separate space located inside of the ferrofluid seal. Thus by the use of a Labyrinth seal with the ferrofluid seal to form a chamber between the lubricant and the seal and pressurizing this chamber, the lubricant is kept from coming into contact with the ferrofluid seal. Low pressure air may be used to achieve the positive pressure. In addition the temperature and pressure limitations can be eliminated by the use of cool air in the chamber or cavity.

The accompanying drawing, which forms a part of this specification, is a cross sectional elevation view of a preferred embodiment of my invention in its operative position.

In the drawing, wherein for the purpose of illustration is shown the preferred embodiment of my invention, the numeral 10 designates a gearbox/transmission housing with a magnetically permeable shaft 11 extending from within it.

The shaft 11 passes through a controlled clearance (Labyrinth) seal 12 and through a pressurized air cavity 14 before exiting through the ferrofluid seal 16.

The two seals 12 and 16 form the air cavity 14 into which low pressure air is fed through an air valve 18 located directly above and perpendicular to the air cavity. This can be connected to any source of low pressure air such as the engine manifold, or an air scoop intake, etc.

The pressurized air escapes from the air cavity 14 through the controlled clearance (Labyrinth) seal 12 and is allowed to escape through a low pressure valve 19 located in the gearbox/transmission housing 10 at a point directly above the miscible liquid.

This low pressure air passing through the Labyrinth seal 12 prevents the miscible liquid from entering the air cavity 14 and thus coming in contact with the ferrofluid seal 16.

Having thus described my invention, what I claim and desire to protect by Letters Patent is:

1. In combination with a gearbox/transmission housing or the like containing a liquid lubricant and having a shaft extending from within; a ferrofluid magnetic sealing means interposed between the shaft and housing and encircling the shaft at the point of exit from the housing; a pressurized air supply cavity spaced axially inward next to the said ferrofluid magnetic sealing means; and a controlled clearance labyrinth seal spaced axially inward next to the pressurized air supply cavity, thereby preventing the said internally contained liquid lubricant from contacting the said ferrofluid magnetic sealing means.

2. In combination with a gearbox/transmission housing or the like containing a liquid lubricant and having a shaft extending from within; a ferrofluid magnetic sealing means interposed between the shaft and housing and encircling the shaft at the point of exit from the housing; and a pressurized air supply cavity spaced axially inward next to the said ferrofluid magnetic sealing means, thereby preventing the said internally contained liquid lubricant from contacting the said ferrofluid magnetic sealing means.

3. In combination with a gearbox/transmission housing or the like containing a liquid lubricant and having a shaft extending from within a ferrofluid magnetic sealing means interposed between the shaft and housing and encircling the shaft at the point of exit from the housing; a pressurized air supply cavity spaced axially inward next to the said ferrofluid magnetic sealing means; and a controlled clearance air orifice spaced axially inward next to the pressurized air supply cavity, thereby preventing the said internally contained liquid lubricant from contacting the said ferrofluid magnetic sealing means.

4. A device as set forth in claim 3 wherein the pressurized air supply cavity comprises an air cavity spaced axially inward next to the ferrofluid magnetic sealing means, an air valve for supplying pressurized air into said air cavity, and a low pressure escape valve located in the said gearbox/transmission housing.

* * * * *